United States Patent Office 3,666,483
Patented May 30, 1972

3,666,483
METHOD OF PRODUCING UNIT PORTIONS OF INSTANT COFFEE OR INSTANT TEA
Sven-Erik Tessmar, 8 Lannasbacken
124 43 Bandhagen, Sweden
No Drawing. Filed Mar. 12, 1970, Ser. No. 19,118
Int. Cl. A23f 1/08, 3/00
U.S. Cl. 99—65      4 Claims

ABSTRACT OF THE DISCLOSURE

A method of producing unit portions of instant coffee or tea which comprises the steps of mixing dry coffee or tea concentrate with a binder substance and forming the resulting coherent composition into unit portions. The binder substance comprises either a mixture of a fat which is solid or semi-solid at room temperature and an emulsifier or a mixture of a fatty acid which is solid or semi-solid at room temperature and a substance capable of forming a water-soluble salt with the fatty acid. The proportions of the dry coffee or tea concentrate to the fat or fatty acid should lie in the range from 2:1 to 1:3.

---

The present invention relates to a method for producing unit portions of instant coffee or instant tea, i.e. rapidly dissolved coffee or tea concentrates produced by spray drying, freeze drying or any other suitable method. Liquid coffee or tea concentrate of the type obtained prior to the drying step in the normal production of powdered coffee or tea concentrates can also be used as a starting material in the method of the invention. The object of the present invention is to enable such concentrates to be obtained in forms which are advantageous to the manufacturer, the distributor and the consumer.

Concentrates of the type referred to are at present only obtainable in the form of powders prepacked in glass containers. This type of container is not sufficiently efficient. It also requires relatively large storage space and incurs large distribution costs. Furthermore, it is also relatively difficult to measure the powder in suitable portions when preparing the beverage and the powder is liable to absorb moisture once the container has been opened.

The present invention relates to a coffee and tea concentrate which can be obtained in a form whereby more rational, lighter and less expensive containers can be used, thereby reducing the requirement of storage space and incurring lower distribution costs, in addition to reducing the requirement of display space for selling purposes and improving the durability of the product. The product produced in accordance with the invention has the advantage of being easily converted to beverage form and can be stored for a long period of time without absorbing moisture.

In accordance with the invention, the coffee or tea concentrate is blended with a fat which is solid or semi-solid at room temperature and with an emulsifier or a fatty acid which is solid or semi-solid at room temperature and a compound which forms a water-soluble salt of the fatty acid, whereafter the composition is formed into unit portions.

By "unit portions" is primarily meant in accordance with the invention solid products in the form of, for example, tablets of a size suitable for preparing a cup of the beverage in question, slabs divided into squares such as in the manner of chocolate bars, in which each square corresponds to a cup of said beverage and cubes or similar shapes. In these instances the composition is produced by selecting a suitable fat or fatty acid which is solid at room temperature. The composition, however, may also be in the form of a paste at room temperature, whereupon it can be packed in compressible tubes, from which a suitable quantity can be discharged when preparing the beverage, or can be contained in foil packets of conventional type equalling one portion of the composition.

The fat or fatty acid serves mainly as a binder for imparting the powder a consistency which enables it to be given a suitable form, e.g. punched into tablets by a tablet making machine, pressed or moulded into slabs, or placed in a tube or portion-containing packet. Suitable fats are cocoa butter and coconut butter, although in principle any edible fat and fat mixture can be used, provided that it can be obtained in a form in which it is free from substances which give rise to secondary flavours. Suitable fatty acids are oleic acid, stearic acid, ricinoleic acid and the like and mixtures thereof, for example such which are derived from natural fats. When preparing solid products, such as tablets and slabs, the fat or fatty acid should have a relatively high melting point, e.g. 30–50° C., particularly 40–45° C., so that the product retains its given form at normal room temperature but which nevertheless is able to melt rapidly and dissolve in hot water (80–100° C.). When preparing paste products, fat or fatty compositions or fatty acids are used which have a lower melting point, e.g. 20–35° C.

The proportions between the fat and fatty acid and the concentrate are established so that the composition obtains a consistency which enables it to be shaped in the desired manner and, when concerning solid products, retains the given shape without crumbling. In principle it is desirable that the percentage of coffee or tea concentrate is the highest possible but this percentage is progressively limited by the fact that the coherence of the composition is impaired if the quantity of binder present is insufficient. Generally a mixture with a proportion factor of 2:1–1:3 between the concentrate and fat or fatty acid can be used, the ratio preferably being in region of 1:1–1:2, although the most suitable ratio may vary with the nature of the fat or fatty acid. The most suitable proportions in any given case can be readily estabilshed by simple experiments.

The purpose of the emulsifier in the composition which contains fat is to emulsify the fat in the water when dissolving the product, so that no droplets of fat are visible on the surface of the beverage, which would otherwise render it unappetizing. Suitable emulsifiers include all substances which can form a stable emulsion of fat in water and which, of course, are pharmaceutically acceptable, i.e. have no toxic reactions when taken in the necessary concentration. Anionic, cationic and non-ionic emulsifiers of many different known types can be used. Preferred emulsifiers are ethoxylated higher alcohols and alkylphenols, soyabean lecithin, sorbitanmonolaurat and lauryl sarcosinate. Naturally, mixtures of emulsifiers can be used if so desired.

The emulsifier is added to the composition in small quantities, sufficient to emulsify the fat present in the amount of water used when preparing the beverage. As a rule 1–20% by weight of the quantity of fat used is sufficient, depending on the nature of the emulsifier used.

When using fatty acids as a binding agent, a quantity of basic substances sufficient to convert the fatty acid to a water-soluble salt is added to the composition. In this instance, inorganic or organic substances can be used, such as sodium carbonate, potassium carbonate or other basic reacting salts or organic bases, such as ethanol amines, e.g. triethanolamine, diethanolamine, monoethanolamine. Naturally, only pharmaceutically acceptable salt-forming substances may be used.

It is also within the scope of the invention to use in combination fatty acids and salt-building substances and fat and emulsifier. It is possible in this way, for example, to estimate the consistency in an expedient manner.

In addition to the aforementioned ingredients other ingredients can be added if desired, primarily sugar or other sweetening agents (saccharin or cyclamate) or other flavouring agents and cream or milk powder or substitutes therefor. Further, it may be suitable to add bactericides, e.g. sorbic acid, cetyl pyridinium chloride.

The invention will now be illustrated by a number of examples.

EXAMPLE 1

One portion of coffee powder, 2 portions of cocoa butter and 0.2 portion of ethoxylated $C_{14}$-alcohol were mixed whilst heated to about 50° C., whereafter the melt was poured into a mould divided into squares.

When the composition had cooled, a slab was obtained in the form of a chocolate bar. A square placed in a cup of hot water rapidly produced good coffee. Owing to the emulsifier present, the fat in the composition is completely emulsified in the water, so as to exclude any droplets of oil on the surface of the coffee.

EXAMPLE 2

1 portion of coffee powder, 1 portion of cocoa butter, 0.1 portion of nonylphenol-tetraethylene oxide and 0.1 portion of nonyl phenol-dodecaethylene oxide were mixed whilst heating to about 50° C., whereafter the melt was poured into a mould in the same manner as described in Example 1. The product could be used in the same manner as that obtained in Example 1.

EXAMPLE 3

1 portion of coffee powder was mixed at about 50° C. with 1 portion of a commercial fatty acid mixture mainly comprised of $C_{18}$-fatty acids, 0.5 portion triethanolamine and 0.05 portion of sorbic acid. Subsequent to cooling the composition, a product having a paste like consistency was obtained, which could be packed in tubes.

EXAMPLE 4

1 portion of coffee powder was mixed at about 50° C. with 0.5 portion of cocoa butter, 0.5 of a portion of the same fatty acid mixture as that used in Example 3, 0.1 portion of lauryl sarcosinate, 0.25 portion of triethanolamine and 0.01 portion of cetyl pyridiniumchloride. The mixture, which was solid when cooling to room temperature, was used for preparing tablets and cubes.

Tea products can be prepared by replacing the coffee powder in the aforegoing example with approximately the same quantity of powdered tea.

All the products obtained in the examples rapidly dissolved in hot water and quickly gave a beverage ready to drink. No droplets of fat could be seen on the surface.

The products had unlimited durability and, with regard to the solid products, showed no tendency to crumble.

The invention is not restricted to the examples, which can be varied and modified without trespassing from the scope of the invention. As previously mentioned, additional ingredients can be added, such as sweetening agents and powdered cream.

What is claimed is:

1. A method for preparing products of dry coffee or tea concentrate, comprising mixing the dry coffee or tea concentrate with at least one binder selected from the group consisting of
   (a) a fat which is solid or semi-solid at room temperature together with an emulsifier and
   (b) a fatty acid which is solid or semi-solid at room temperature together with a substance which can form a water-soluble salt with the fatty acid,
   said concentrate and said binder forming a composition of coherent consistency wherein the proportions of the concentrate to the fat or fatty acid lie in the range from 2:1 to 1:3,
   and forming said composition into portion units.

2. A method according to claim 1, wherein the fat or fatty acid and the quantity thereof is selected so that the composition is solid at room temperature, and that said composition is shaped into tablets, slabs, cubes or other solid bodies.

3. A method according to claim 1, wherein the fat or fatty acid and the quantity thereof are selected so that the composition is in the form of a paste at room temperature and is packed in tubes or portion packets.

4. A method according to claim 1, wherein a bactericide is incorporated in the mixture.

References Cited

UNITED STATES PATENTS

| | | | |
|---|---|---|---|
| 256,082 | 4/1882 | Von Hofmann | 99—66 |
| 2,929,716 | 3/1960 | Barch et al. | 99—71 |
| 2,564,332 | 8/1951 | Kellogg | 99—71 |
| 1,381,821 | 6/1921 | Greenberg | 99—71 |
| 2,889,226 | 6/1959 | Hinkley | 99—66 |
| 3,102,075 | 8/1963 | Millard. | |
| 3,385,710 | 5/1968 | Reymond et al. | 99—78 X |
| 3,007,797 | 11/1961 | Tiktak et al. | 99—71 |

OTHER REFERENCES

Furia, Handbook of Food Additives, 1968, pp. 250–252.

FRANK W. LUTTER, Primary Examiner

W. L. MENTLIK, Assistant Examiner

U.S. Cl. X.R.

99—66, 71, 76, 77, 171 B